(12) United States Patent
Dolleris et al.

(10) Patent No.: US 8,786,928 B2
(45) Date of Patent: Jul. 22, 2014

(54) SINGLE MIRROR OPTICAL SCANNER

(75) Inventors: Casper Dolleris, Vancouver (CA); Bjarne Asah, Sengeløse Taastrup (DK)

(73) Assignee: Intenzity Innovation APS, Hvidovre (DK)

( * ) Notice: Subject to any disclaimer, the term of this patent is extended or adjusted under 35 U.S.C. 154(b) by 97 days.

(21) Appl. No.: 13/322,916

(22) PCT Filed: May 27, 2010

(86) PCT No.: PCT/US2010/036373
§ 371 (c)(1),
(2), (4) Date: Mar. 19, 2012

(87) PCT Pub. No.: WO2010/138699
PCT Pub. Date: Dec. 2, 2010

(65) Prior Publication Data
US 2012/0170095 A1  Jul. 5, 2012

Related U.S. Application Data

(60) Provisional application No. 61/182,461, filed on May 29, 2009.

(51) Int. Cl.
*G02B 26/08* (2006.01)
*G02B 26/10* (2006.01)
(52) U.S. Cl.
CPC ............................ *G02B 26/101* (2013.01)
USPC ..................... 359/212.2; 359/214.1
(58) Field of Classification Search
USPC ........................... 359/214.1, 215.1
See application file for complete search history.

(56) References Cited

U.S. PATENT DOCUMENTS

| | | | |
|---|---|---|---|
| 4,984,892 A * | 1/1991 | Hofmann | ........................ 356/625 |
| 5,673,139 A | 9/1997 | Johnson | |
| 2009/0147224 A1* | 6/2009 | Kurozuka et al. | ............... 353/98 |

FOREIGN PATENT DOCUMENTS

WO           98-13720 A1    4/1998
WO    WO 2007034875 A1 *  3/2007

OTHER PUBLICATIONS

International Search Report dated Jan. 11, 2011 for PCT Patent Application No. PCT/US2010/036373, 3 pages.
Written Opinion of the International Searching Authority dated Jan. 11, 2011 for PCT Patent Application No. PCT/US2010/036373, 4 pages.

* cited by examiner

*Primary Examiner* — Jade R Chwasz
(74) *Attorney, Agent, or Firm* — Vista IP Law Group, LLP

(57) ABSTRACT

A device includes an optical scanner that comprises a mirror, a first actuator that rotates the mirror around a first axis of rotation, a first angular position sensor that senses an angular position of the mirror around the first axis of rotation, a second actuator that rotates the mirror around a second axis of rotation, a second angular position sensor that senses an angular position of the mirror around the second axis of rotation, and a controller coupled to the first and second drivers to drive the respective first and second actuators to rotate the mirror into respective angles around the first and second axes of rotation.

28 Claims, 6 Drawing Sheets

SINGLE MIRROR OPTICAL SCANNER

RELATED APPLICATION DATA

This application is the national stage of International Application No. PCT/US2010/036373, filed May 27, 2010, which claims priority to and the benefit of U.S. Provisional Pat. Application No. 61/182,461, filed on May 29, 2009, the disclosures of both of which are expressly incorporated by reference herein.

FIELD

The present disclosure relates to a compact optical scanner with a single moving mirror arranged to deflect an electromagnetic beam into a desired direction in space with high accuracy given by spherical coordinates (azimuth, inclination).

BACKGROUND

Typically, known scanners for scanning a light beam across a two-dimensional surface include two mirrors that are mounted for rotation around mutually perpendicular axes of rotation so that one mirror scans the light beam along an x-axis on the surface and the other mirror scans the light beam along a y-axis on the surface.

Scanners with a single moving mirror are also known in which the mirror is arranged for rotation around two axes of rotation. The accuracy and range of angular deflection of such scanners have yet been lower than for scanners with two mirrors.

SUMMARY

In accordance with one embodiment of the present disclosure, an optical scanner is provided with a mirror that is mounted for rotation around at least two axes of rotation so that an electromagnetic beam incident upon it is deflected into a desired direction in space given by spherical coordinates (azimuth, inclination), each of which may be varied within a certain angular range that is, e.g., 90° wide.

The scanner may further comprise a first actuator for rotating the mirror around a first axis of rotation and a first driver for driving the first actuator.

The first actuator may be a magnetic actuator.

In order to improve the accuracy of the angular position of the mirror, the scanner may further comprise a first angular position sensor for sensing the angular position of the mirror around the first axis of rotation.

In accordance with another embodiment, the scanner further comprises a second actuator for rotating the mirror around a second axis of rotation and a second driver for driving the second actuator. The second actuator may be a magnetic actuator.

In order to further improve the accuracy of the angular position of the mirror, the scanner comprises a second angular position sensor for sensing the angular position of the mirror around the second axis of rotation.

The angular position sensors include at least one from among optical sensors, capacitive sensors, magnetic sensors, e.g., including a sensor coil, or a Hall element.

In accordance with another embodiment, the scanner further comprises a controller for controlling the first and second drivers to drive the respective first and second magnetic actuators to rotate the mirror into respective specific angles around the axes of rotation. For each of the first and second magnetic actuators, the controller may be included in a closed control loop wherein the controller receives a signal from the respective angular position sensor with a measure of the current angular position of the mirror and controls the respective driver of the magnetic actuator for adjustment of the angular position of the mirror until the signal from the respective angular position sensor corresponds to the desired position.

Various safety systems may also be included in the scanner, such as monitoring of the mirror positions and temperature feedback, e.g., from the rear side of the mirror.

In accordance with another embodiment, the scanner further comprises an electronic interface connector that is connected to the controller for reception of electronic signals containing commands for the controller, e.g., commands that indicates a desired angular position (azimuth, inclination) of the mirror whereby the electromagnetic beam output by the optical scanner may travel a desired scan pattern in response to a sequence of corresponding commands received as electronic signals through the electronic interface connector.

In accordance with another embodiment, a specific command specifies the desired time duration of a scan pattern, e.g., specified as the time to be elapsed between two commanded angular positions of the electromagnetic beam.

In accordance with a further aspect of the present disclosure, the interface connector is configured for interconnection of analogue signals for which a specific voltage corresponds to a specific angle of the deflected electromagnetic beam, e.g., the azimuth angle may be commanded as an analogue voltage of one signal line, and the inclination angle may be commanded as an analogue voltage of another signal line.

In this way, the scanner may receive commands in analogue form or in digital form as appropriate for a certain use, and the controller may control the deflected electromagnetic beam output by the scanner to scan any arbitrary scan pattern within a certain azimuth and inclination angular range. The intensity of the electromagnetic beam may or may not be varied along the scan pattern. For example, the electromagnetic beam may be turned off during a certain part of the scan. The optical scanner may include a shutter for this purpose. The shutter may be controlled by the controller. The commands may include commands for the control of the shutter.

For example, the output electromagnetic beam may traverse linear scan patterns in which a planar surface illuminated by the output electromagnetic beam traverses the surface line by line, e.g., from left to right in an interlaced or a non-interlaced manner, wherein the electromagnetic beam may or may not be turned off between scanned lines, or in a meander pattern. The scan patterns may further include without limitation arbitrary Lissajou patterns, spiral patterns, and circular patterns.

Preferably, the first and second axes of rotation are substantially perpendicular to each other. Alternatively, the first and second axes of rotation may intersect each other.

Preferably, the point of intersection resides on the surface of the mirror, ideally on a center of the surface of the mirror.

In accordance with another embodiment, the scanner commands include a command for positioning the mirror for deflection of the electromagnetic beam into a specific direction in a spherical coordinate system.

In accordance with a another aspect of the present disclosure, the scanner may further include a memory that is interconnected with the controller and that contains commands stored in sequence for formation of a set of scan patterns of the electromagnetic beam, and wherein the controller upon receipt of a specific command is configured for sequentially reading the commands of the specific scan pattern from the memory and sequentially control the angular positions of the mirror in such a way that the electromagnetic beam traverses the intended specific scan pattern within a specific time.

The specific time may be variable and may be set by a specific command.

In accordance with a further embodiment, the optical scanner includes a source for emission of the electromagnetic beam, such as, without limitation, a solid state laser or an LED. The controller may further be configured for controlling the source. The controller may for example control the source to emit the electromagnetic beam at varied intensities during scanning of a specific scan pattern. For example, the controller may be configured to turn the source off during various parts of a scan pattern.

In accordance with another embodiment of the present disclosure, the optical scanner further includes an optical connector for interconnection with a source for emission of the electromagnetic beam.

In accordance with still yet a further aspect of the present disclosure, the optical scanner further includes a focusing lens that is positioned in the propagation path of the electromagnetic beam for focusing the deflected electromagnetic beam at a specific distance from the optical scanner, e.g., at a surface intended to be scanned with the output electromagnetic beam.

The focusing lens may be movable whereby the distance between the scanner and the focus point of the output electromagnetic beam may be adjusted.

Ideally, the focusing lens is mounted for rotation together with the mirror whereby the mirror and the focusing lens are kept in mutually fixed positions irrespective of the current angular position of the mirror for improved focusing of the deflected electromagnetic beam.

The mirror may be a segmented mirror for splitting the electromagnetic beam incident upon it into a plurality of deflected electromagnetic beams propagating along different individually deflected propagation paths for increased scanning speed of a surface.

In accordance with a further embodiment of the present disclosure, the optical scanner further includes an optical sensor that senses electromagnetic radiation received from a surface illuminated by the deflected electromagnetic beam and deflected into the optical sensor by the mirror. In this way feedback signals may be obtained from a surface scanned by the deflected electromagnetic beam, e.g., without limitation, backscattered radiation, reflected radiation, fluorescence radiation, phosphorescence radiation, and infrared radiation or a combination of the foregoing.

In accordance with a further aspect of the present disclosure, the controller is further configured for evaluation of the feedback signals, and it may further be configured for modifying the scan pattern, e.g., the intensity of the output electromagnetic beam, in response to results of the evaluation.

The electromagnetic beam may be, without limitation, an infrared light beam or a visible light beam.

Using a single mirror for non-planar deflection of an electromagnetic beam has many advantages such as providing a short total optical path, a very short distance from deflection mirror to a focusing lens, a constant path length from rotation point, reduced optical losses, reduced beam distortion when coupled with a focusing system, beam input and output in the same plane, larger beam path with the same mirror size, more flexible options for placing a focusing system, and reduced physical size.

In a scanner with two mirrors, the second mirror needs to be larger than the first mirror due to the deflection of the first mirror so that the aperture size is limited. This is avoided in the present scanner.

Also in a scanner with two mirrors, the two axes of rotation do not intersect. This becomes an issue when a focusing lens is used after the two deflection mirrors. The unequal distances from the axes of rotation cause unequal and increased distortion of the focused beam.

Still further, the two mirrors cannot be placed as closely to a focusing system as a one mirror system, with the effect that the scanner with two mirrors exhibits a larger displacement of the electromagnetic beam on the focusing lens. Ideally, only the angle should change on the focusing lens. The displacement causes the beam to enter the lens off center, thus increasing distortion.

Yet still further, two mirrors will have higher losses than one mirror.

Conventional single mirror scanners are based on piezo-transducers leading to much less angular deflection ranges and no closed loop control.

Preferably, a very compact optical scanner is provided with integration of the mirror, mirror actuators, feedback sensors, drivers, servo controller and safety systems into one unit.

In accordance with some embodiments, an optical scanner includes a mirror mounted for rotation around at least two axes of rotation, the at least two axes of rotation having a first axis of rotation and a second axis of rotation, a first actuator that rotates the mirror around the first axis of rotation, a first driver that drives the first actuator, a first angular position sensor that senses an angular position of the mirror around the first axis of rotation, a second actuator that rotates the mirror around the second axis of rotation, a second driver that drives the second actuator, a second angular position sensor that senses an angular position of the mirror around the second axis of rotation, a controller coupled to the first and second drivers to drive the respective first and second actuators to rotate the mirror into respective angles around the first and second axes of rotation, respectively, and an electronic interface connector coupled to the controller for reception of electronic signals for control of the first and second drivers.

In accordance with other embodiments, a device includes an optical scanner that comprises a mirror, a first actuator that rotates the mirror around a first axis of rotation, a first angular position sensor that senses an angular position of the mirror around the first axis of rotation, a second actuator that rotates the mirror around a second axis of rotation, a second angular position sensor that senses an angular position of the mirror around the second axis of rotation, and a controller coupled to the first and second drivers to drive the respective first and second actuators to rotate the mirror into respective angles around the first and second axes of rotation.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of the scope of the claims.

DETAILED DESCRIPTION

Figure 1:
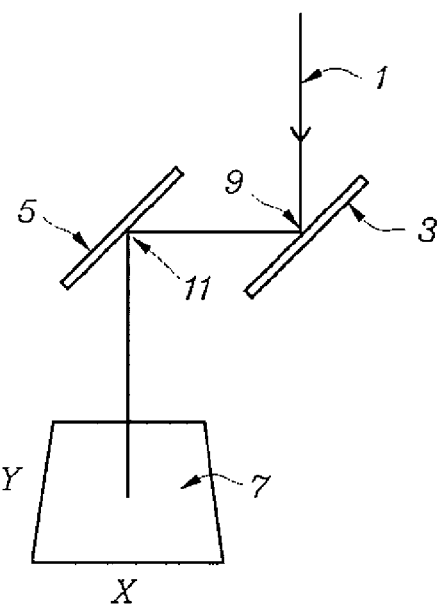
FIG. 1 schematically illustrates the basic operating principle of a conventional optical scanner with two mirrors.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated. In addition to the shown embodiments, the disclosure may be embodied in different forms and should not be construed as limited to the embodiments set forth herein.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with optical scanners, including but not limited to mirrors and light sources, have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having." Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Described herein below is a device for deflecting an optical beam along two perpendicular axes using only one mirror. The beam is deflected by angling the mirrors around a common rotation point. Using only one mirror to deflect an optical beam has many advantages, including a short total optical path, very short distance from deflection mirror to a focusing lens, constant path length from rotation point, reduced optical losses, reduced beam distortion when coupled with a focusing system, beam input and output in the same plane, larger beam path with the same mirror size, more flexible options for placing a focusing system, and reduced physical size.

Traditionally deflection systems are based on two galvanometers that are placed sequentially in the optical path. One galvanometer and mirror deflects in one axis and the other galvanometer with a second mirror deflects in the second axis. This approach works well for many applications but has some disadvantages.

The second mirror needs to be larger than the first mirror due to the deflection of the first mirror. This limits beam aperture size.

The two axes will not share a common rotating point. This becomes an issue when a focusing lens is used after the two deflection mirrors. The unequal distance from the rotation points causes unequal and increased distortion of the focused beam.

The two mirrors cannot be placed as closely to a focusing system as a one mirror system, thereby increasing parallel shift on the focusing lens.

Ideally only the angle should change on the focusing lens. The parallel shift causes the beam to enter the lens off center thus increasing distortion.

Two mirrors will have higher losses than one mirror.

Beam deflection systems with one mirror already exist but these are based on piezo technology and offers much less angular deflection and no closed loop control.

This device uses a magnetic motor to rotate the deflection mirror in the axis of the incoming beam. This system is then mounted on a secondary system that rotates the first system and mirror around an axis that is perpendicular to the first axis. The result is that the two axes are stacked and that they can deflect the beam in two axes while each rotational axis passes through the center of the mirror at the mirror surface.

Each axis has a feedback system to determine the rotational position of the mirror. This system can be implemented in various ways. One implementation is as a magnetic feedback system—this system is inherently immune to optical disturbance, which is an advantage when deflecting high power optical beams. Another implementation could be an optical feedback system or capacitive. Each system has advantages and disadvantages. In this device the magnetic system is chosen due to the lack of sensitivity to optical radiation.

In a traditional galvanometer based dual axis deflection system each galvanometer must have a driver that amplifies controller signals and a controller that generates the driver signal and receives feedback from closed loop position sensors.

These drivers and controllers are normally separate units adding to the bulk of the complete system. In the device presented here the drivers for the magnetic motors as well as a servo controller are built into the unit. This means that the whole deflection system is completely self contained and very compact. Various safety systems are built into the unit as well, such as monitoring of the mirror positions and temperature feedback from the backside of the deflection mirror.

This design is very unique because it has traditionally been very difficult to achieve two dimensional angling of a mirror with a common reference point in the mirror center.

Another non-trivial issue to overcome is that the one axis will produce beam angles excursions that is a function of the other axis. This effect is negated by use of the integrated controller that calculates in real time the compensation needed to produce linear motion.

For single mirror deflector the motor for the second axis is moved by the first axis. It is critical to reduce the mechanical inertia in this second motor so that fast movements from point to point of less than one millisecond of the mirror can be obtained. This has been done by moving the bulk of the moving mass into the center of rotation thereby lowering the forces required to rotate the mass.

This compact single mirror design enables new applications in medical handheld devices. Due to the very short optical path combined with a large aperture a smaller spot size can be obtained compared to traditional two mirror designs.

Another application is in handheld marking devices that can be battery operated and feature a built in laser that is steered toward a surface to be marked.

FIG. 1 schematically illustrates the basic operating principle of a conventional optical scanner with two mirrors. An electromagnetic beam 1 is incident on the first mirror 3 that is mounted for rotation about an axis of rotation perpendicular to the plane of the figure and for intersecting the mirror at the illustrated point of incidence 9. After reflection by the mirror 3, the beam 1 propagates towards the second mirror 5 mounted for rotation about an axis of rotation in the plane of the figure and extending along the illustrated cross-section of the second mirror 5 for reflection and further propagation towards a target surface 7 to be scanned. It should be noted that with the second mirror 5 is kept in a fixed position, the beam 1 is scanned along a line in parallel with X by rotation of the first mirror 3. Likewise, with the first mirror 3 kept in a fixed position, the beam 1 is scanned along a line in parallel with Y by rotation of the second mirror 5.

FIG. 1 mainly serves to revive the various issues associated with a conventional optical scanner with two mirrors, such as: (a) the second mirror needs to be larger than the first mirror due to the deflection of the first mirror whereby aperture size is limited; (b) the two axes of rotation do not intersect leading to unequal distances to a possible focusing lens which again leads to unequal and increased distortion of the focused beam; and (c) the two mirrors cannot be placed as closely to a focusing system as in a single mirror scanner thereby increasing parallel shift displacement across the focusing lens, desirably only the angle of incidence should vary. The parallel shift causes the beam to enter the lens off center thus increasing distortion; two mirrors have higher losses than one mirror.

Generally, the present disclosure is directed to a device having an optical scanner, the optical scanner structured to include a mirror, a first actuator that rotates the mirror around a first axis of rotation, a first angular position sensor that senses an angular position of the mirror around the first axis of rotation, a second actuator that rotates the mirror around a second axis of rotation, and a second angular position sensor that senses the angular position of the mirror around the second axis of rotation. The device also includes a controller coupled to the first and second drivers and structured to drive the respective first and second actuators to rotate the mirror into respective specific angles around the axes of rotation as sensed by the respective first and second angular position sensors.

Figure 2:
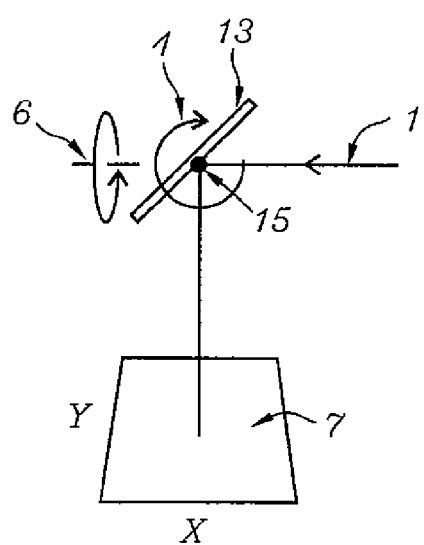
FIG. 2 schematically illustrates the basic operating principle of an optical scanner according to the disclosure.

FIG. 2 schematically illustrates the basic operating principle of an optical scanner according to the disclosure. An electromagnetic beam 1 is incident on the mirror 13 that is mounted for rotation about an axis of rotation extending perpendicular to the plane of the figure and intersecting the mirror at the illustrated point of incidence 15. Further, the mirror 13 is mounted for rotation about an axis of rotation in the plane of the figure and extending along the illustrated cross-section of the mirror 13, for reflection and further propagation towards a target surface 7 to be scanned; and thus, the illustrated point of incidence 15 constitutes a pivot point of the mirror 13 that is the only point of the mirror surface that is kept fixed when the mirror 13 rotates. It should be noted that when the mirror 13 does not rotate about the axis of rotation extending in the plane of the figure, the beam 1 is scanned along a line in parallel with X by rotation around the axis of rotation extending perpendicular to the plane of the figure. Likewise, when the mirror 13 does not rotate around the axis of rotation extending perpendicular to the figure; the electromagnetic beam 1 is scanned along a line in parallel with Y by rotation around the axis of rotation extending in the plane of the figure.

By appropriate control of the amount of angular rotation around each of the axes of rotation, an arbitrary scan pattern may be drawn by the output electromagnetic beam on the target surface 7. Limited only by the actual angular resolution and accuracy of the angular position with respect to each of the axes of rotation, any point on the target surface 7 may be illuminated by the electromagnetic beam 1, and the electromagnetic beam may be moved from any arbitrary point on the target surface to any other arbitrary point on the target surface as desired by the user of the scanner, and thus, any scan pattern may be drawn across the target surface 7 with the electromagnetic beam 1.

Figure 3:
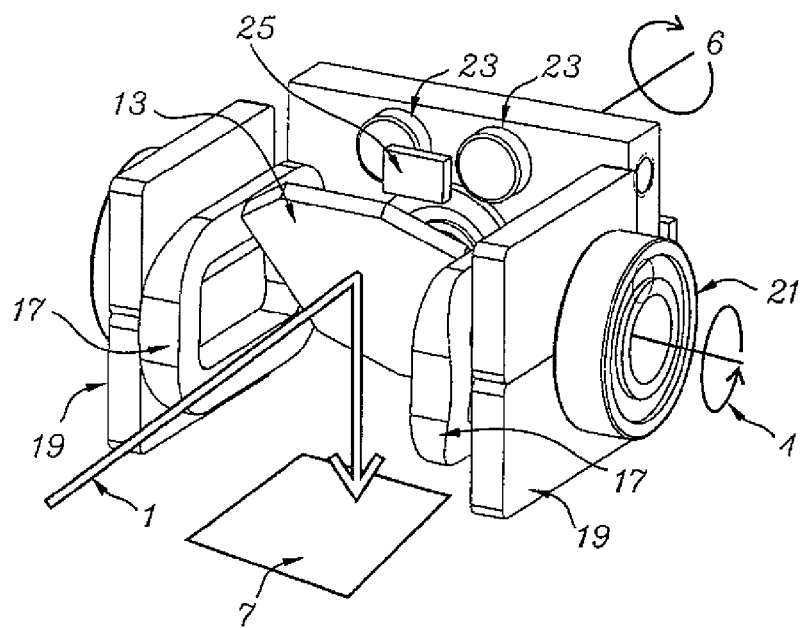
FIG. 3 is a schematic perspective view of a part of an optical scanner according to the disclosure.

FIG. 3 is a schematic perspective view showing a part of the optical scanner in more detail. The drive coils 17 cooperate with the magnets 19, respectively, for rotation of the mirror 13 around a first axis 6 of rotation extending substantially in parallel with the incoming electromagnetic beam 1, i.e., around a bearing almost hidden behind the mirror 13 below the feedback magnets 23. The bearings 21 indicate the second axis 4 of rotation extending substantially perpendicular to the first axis of rotation. The Hall element 25 cooperates with the feedback magnets 23 to signal the actual angular position of the mirror with relation to the first axis of rotation to the controller 35 shown in FIG. 5.

Figure 4:
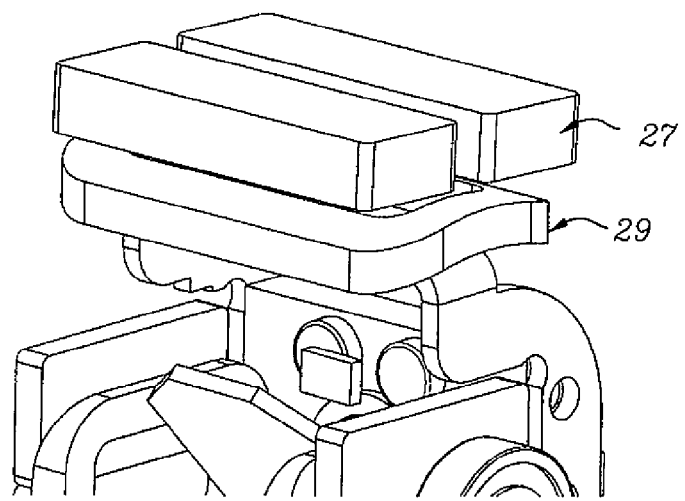
FIG. 4 is a schematic perspective view of another part of an optical scanner according to the disclosure.

FIG. 4 is a schematic perspective view showing a slightly different part of the optical scanner in more detail. The drive coil 29 cooperates with the magnets 27 for rotation of the mirror around the second axis 4 of rotation (shown in FIG. 3) extending substantially perpendicular to the incoming electromagnetic beam 1 (shown in FIG. 3) in a way similar to the operation of the drive coils and magnets shown in FIG. 3 for rotation of the mirror 13 around the first axis 6 of rotation.

Figure 5:
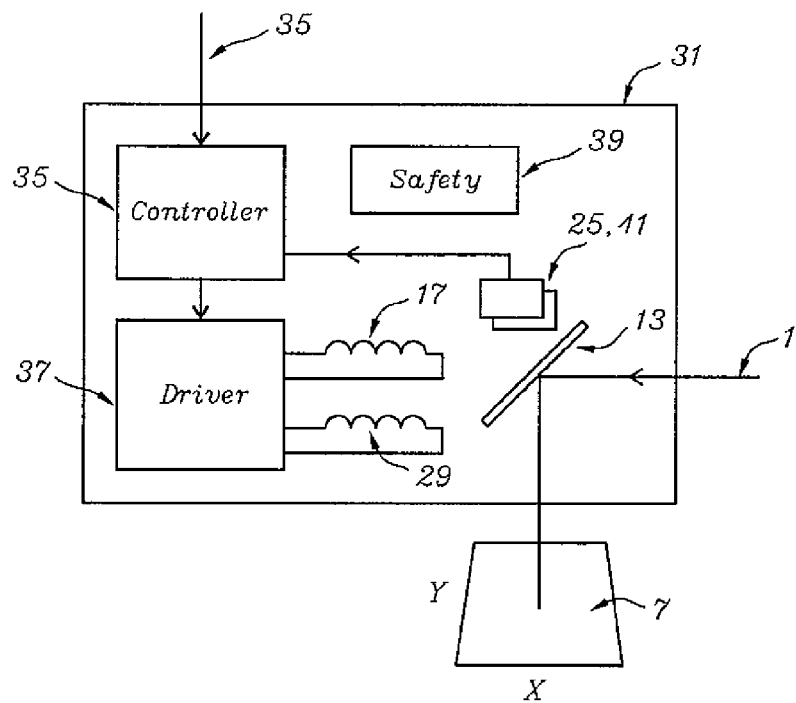
FIG. 5 schematically illustrates various electronic parts of an optical scanner according to the disclosure.

FIG. 5 schematically illustrates various electronic, mechanical and optical parts of an optical scanner according to the disclosure. The illustrated scanner is a very compact optical scanner in which the mirror 13, first and second actuators 17 and 29, feedback sensors 25 and 41, drivers 37, servo controller 35 and safety systems 39 have been integrated into a unit enclosed in a single housing 31. As shown in FIGS. 3 and 4, the mirror 13 is mounted for rotation around two mutually perpendicular axes of rotation so that an electromagnetic beam, such as a light or an infrared beam, incident upon it can be deflected into a desired direction in space given by spherical coordinates (azimuth, inclination), each of which may be varied within a certain angular range that is, e.g., 90° wide. The optical scanner may for example be used to scan a target surface 7 with the deflected electromagnetic beam output by the scanner. By appropriate control of the amount of angular rotation of the mirror 13 around each of the axes of rotation, an arbitrary scan pattern may be drawn by the output electromagnetic beam on the target surface 7. Limited only by the actual angular resolution and accuracy of the angular position of the mirror 13 with respect to each of the axes of rotation, any point on the target surface 7 may be illuminated by the electromagnetic beam 1, and the electromagnetic beam may be moved from any arbitrary point on the target surface 7 to any other arbitrary point on the target surface as desired by the user of the scanner, and thus, any scan pattern may be drawn across the target surface 7 with the output electromagnetic beam.

The user controls the scan pattern through the electronic interface 33 through which electronic signals are transmitted to the controller 35 that contain the next angular position of the mirror and thereby the position of the spot on the target surface 7 illuminated by the output electromagnetic beam. The electronic signals may further contain a timing value that specifies the time to be used to move the mirror between successive angular positions. The controller 35 may further include a memory for storing various predetermined scan patterns as a sequence of predetermined angular positions of the mirror 13. Each of the stored scan patterns may be executed by the controller 35 upon reception of a specific command. The specific command may include a timing value that specifies for example the time duration for the scan pattern in question. In the event that the optical scanner includes a source of electromagnetic radiation, e.g., without limitation a solid state laser or an LED, the controller may further be configured for controlling the source, for example the intensity of the electromagnetic beam emitted by the source, for example the controller may turn the source on and off during scanning thereby for example creating a scan pattern of dots on the target surface 7.

In the event that the source of electromagnetic radiation resides outside the housing of the scanner, the controller may output a control signal through the electronic interface for control of the external source in the same way as described for a source included in the scanner. The scanner may further include a shutter (not shown) controlled by the controller to turn the output electromagnetic beam on and off during scanning. As already mentioned, the scan patterns, including the stored scan patterns, may include, without limitation, line by line scan patterns that may be interlaced or noninterlaced and that may be scanned in the same direction or in opposite directions, successively or in another sequence or randomly, circular scan patterns, polygonal scan patterns, or spiral scan patterns, or a combination of two or more of the foregoing.

As also shown in FIGS. 3 and 4, the optical scanner has first and second magnetic actuators comprising respective driver coils 17 and 29 driven by respective drivers 37 controlled by the controller 35. The driver coils 17 and 29 generates a magnetic field as a function of the current driven through them by the respective drivers, and their magnetic field interacts with the magnetic fields of magnets positioned adjacent to the driver coils 17 and 29 whereby their mutual positions can be adjusted as controlled by the controller 35. In this way, the first driver coil operates to rotate the mirror 13 around the first axis of rotation, and the second driver coil operates to rotate the mirror 13 around the second axis of rotation that is perpendicular to the first axis of rotation and intersect the first axis of rotation at the center of the surface of the mirror 13 in the illustrated optical scanner.

Figure 6:
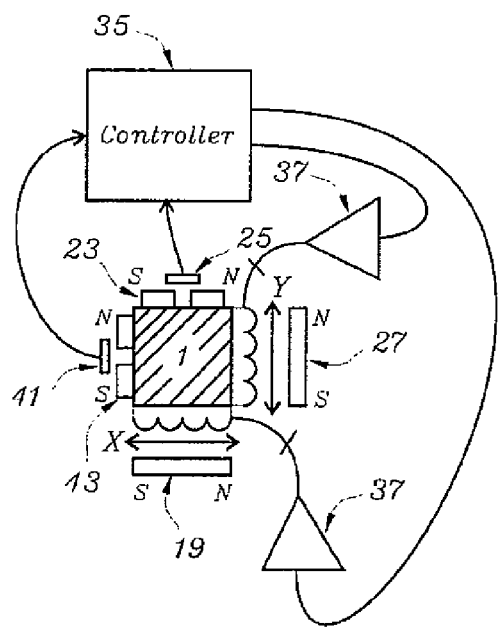
FIG. 6 schematically illustrates the basic operating principle of an optical scanner according to the disclosure with a servo control loop.

The illustrated optical scanner further has mirror position feedback sensors 25 and 41, namely Hall element sensors, each of which senses the magnitude of the magnetic field at the Hall element sensor in question and outputs a corresponding sensor signal to the controller 35 whereby the current position of the Hall element sensor can be determined by the controller 35 so that the controller can operate as a servo controller as further illustrated in FIG. 6 for adjustment of the angular position of the mirror 13 with relation to each of the axes of rotation to be equal to the desired angular position (azimuth, inclination) received electronically through the electronic interface 33 or as stored in the scan memory of the controller 35. In this way, the controller 35 controls the angular position of the mirror 13 very accurately. The safety system 39 may include monitoring of the mirror positions and the mirror temperature sensed at the rear of the mirror 13.

The interface connector may further be configured for interconnection of analogue signals for which a specific voltage corresponds to a specific angle of the deflected electromagnetic beam, e.g., the azimuth angle may be commanded as an analogue voltage of one signal line, and the inclination angle may be commanded as an analogue voltage of another signal line. In this way, the scanner may receive commands in analogue form or in digital form as appropriate for a certain use, and the controller may control the deflected electromagnetic beam output by the scanner to scan any arbitrary scan pattern within a certain azimuth and inclination angular range.

Figure 7:
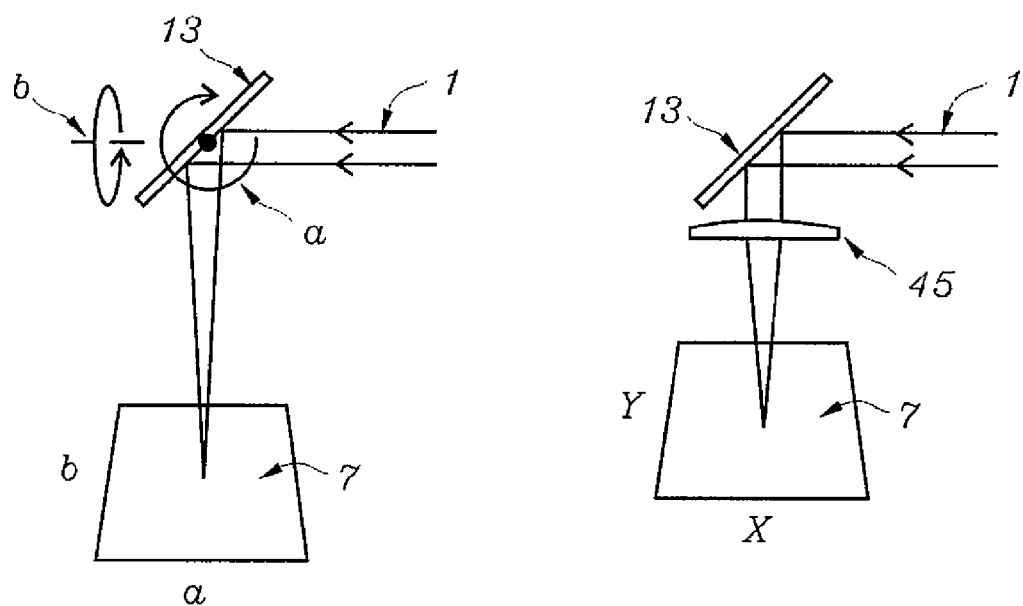
FIG. 7 schematically illustrates the basic operating principle of an optical scanner according to the disclosure with and without a focusing lens between the mirror and the output.
Figure 8:
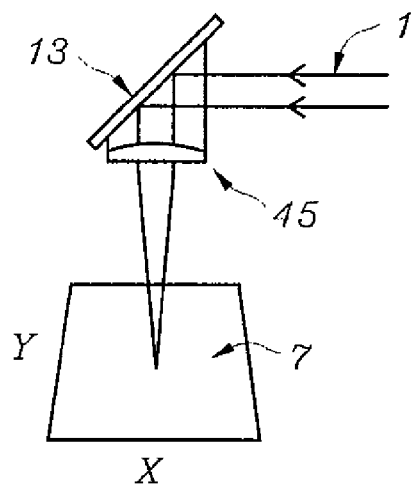
FIG. 8 schematically illustrates the basic operating principle of an optical scanner according to the disclosure with a focusing lens mounted with the mirror.
Figure 9:
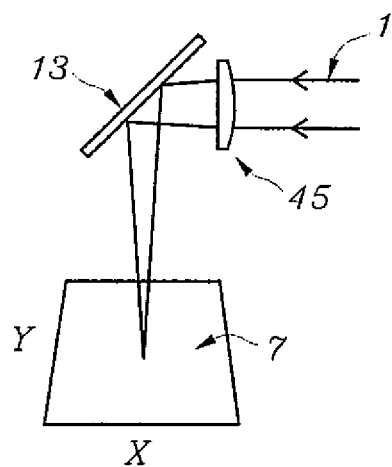
FIG. 9 schematically illustrates the basic operating principle of an optical scanner according to the disclosure with a focusing lens between the input and the mirror.

FIGS. 7-9 schematically illustrate basic operating principles of the optical scanner shown in FIGS. 2-6 with a focusing lens in the propagation path of the electromagnetic beam.

The left part of FIG. 7 shows the optical scanner without a focusing lens that may be used for example for scanning of a target surface 7 at a larger distance from the scanner, and the right part of FIG. 7 shows the optical scanner with a focusing lens 45 that is positioned in the propagation path of the electromagnetic beam of the optical scanner shown in FIGS. 2-6 for focusing the deflected electromagnetic beam at a specific distance from the optical scanner, e.g., at the target surface intended to be scanned with the output electromagnetic beam. The focusing lens may be movable whereby the distance between the scanner and the focus point of the output electromagnetic beam may be adjusted.

FIG. 8 shows the focusing lens 45 mounted for rotation together with the mirror 13 whereby the mirror 13 and the focusing lens 45 are kept in mutually fixed positions irrespective of the current angular position of the mirror 13 for improved focusing of the deflected electromagnetic beam at the expense of an increased weight of the moving mirror assembly.

FIG. 9 shows the focusing lens 45 mounted between the input and the mirror whereby optical distortion due to beam movement across the lens surface is eliminated at the expense of an increased distance from the lens 45 to the target surface. The focusing lens 45 may be movable whereby the distance between the scanner and the focus point of the output electromagnetic beam may be adjusted.

Figure 10:
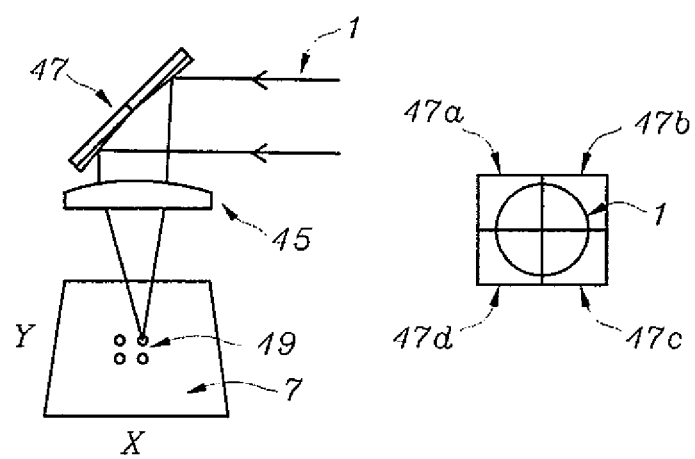
FIG. 10 schematically illustrates the basic operating principle of an optical scanner according to the disclosure with a segmented lens.

FIG. 10 schematically illustrates the basic operating principle of the optical scanner illustrated in FIGS. 2-9 wherein the mirror 47 is a segmented mirror for splitting the electromagnetic beam incident upon it into a plurality of deflected electromagnetic beams 49 propagating along different individually deflected propagation paths for increased scanning speed of a surface since various parts of the scanning pattern are scanned simultaneously.

Figure 11:
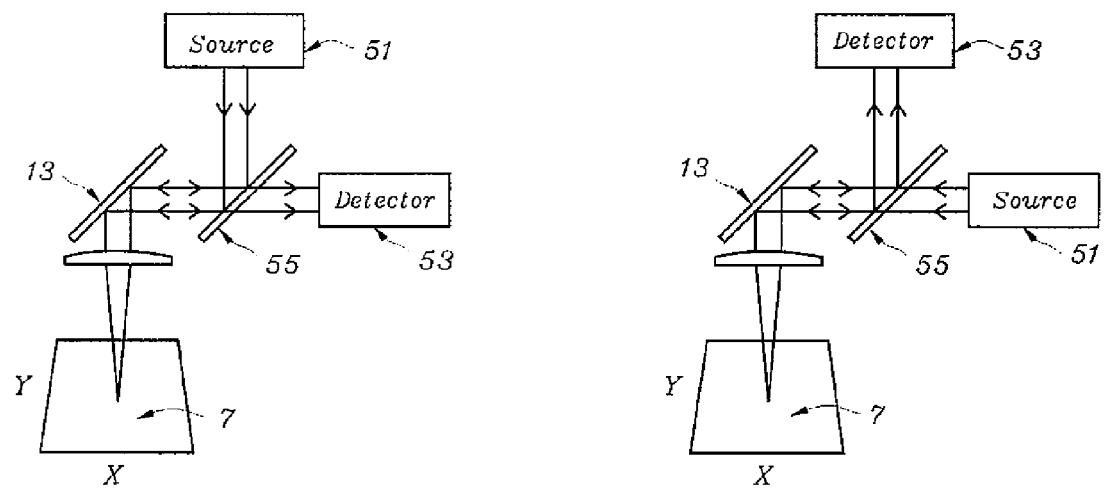
FIG. 11 schematically illustrates the basic operating principle of an optical scanner according to the disclosure including a detector.

FIG. 11 schematically illustrates the basic operating principle of the optical scanner illustrated in FIGS. 2-10 further including an optical sensor 53 for sensing electromagnetic radiation received from a surface 7 illuminated by the deflected electromagnetic beam and deflected into the optical sensor by the mirror. In this way feedback signals may be obtained from a surface scanned by the deflected electromagnetic beam, e.g., without limitation, backscattered radiation, reflected radiation, fluorescence radiation, phosphorescence radiation, or infrared radiation, or a combination of two or more of the foregoing. In the illustrated optical scanner, the controller is further be configured for evaluation of the feedback signals and for modifying the scan pattern, e.g., the intensity of the output electromagnetic beam, in response to results of the evaluation performed.

Using a single mirror for non-planar deflection of an electromagnetic beam has many advantages such as; short total optical path, very short distance from deflection mirror to a focusing lens, constant path length from rotation point, reduced optical losses, reduced beam distortion when coupled with a focusing system, beam input and output in the same plane, larger beam path with the same mirror size, more flexible options for placing a focusing system, and reduced physical size.

Although the present disclosure has been described in connection with the specified embodiments it should not be construed as being in any way limited to the presented examples.

As will be readily appreciated from the foregoing, this unique design breaks with the tradition of having two separate galvanometers for scanning in two dimensions by using a single mirror that pivots around a common reference point at the mirror surface.

This new unit has completely removed the need for external controllers and drivers by integrating them into a tiny cube, in one embodiment having a size of 1×1×1 inch, that is powered by a single 5V supply for ease of use. The scanner has built-in storage for scan patterns and can operate completely stand-alone or can be linked via SPI serial commands to a host processor for complete and flexible control. The scanner uses typically less than 1 W during a scan by removing the need for large and complex driver systems.

The scanner unit is designed for use in medical handpieces, diagnostic equipment, various industrial uses and many other applications requiring deflection of optical beams. The scanner can perform two-dimensional spot movements up to 500 points per second for fast exposure of patterns with discrete points or can perform continuous movement to generate any shape required.

The optical layout greatly simplifies the design of hand pieces by keeping the optical beam very short and in a single plane, unlike the conventional scanner setups. Optical transmission is improved as well by only having a single mirror.

The scanner unit is completely insensitive to stray optical radiation and has a closed loop control of the scanning mirror and a multitude of built-in safety systems, such as over temperature protection, correct mirror position detection, mirror failure detection, and on-board diagnostic LEDs for scanner status indication.

The unit is considerable lower cost than a comparable galvanometer based system with external drivers and controller and does not require any calibration or adjustment.

In one embodiment, the scanner is supplied with a broadband coated mirror for use with almost any wavelength of light but can be fitted with a customized mirror for very high power operation or for other specific requirements.

A development kit is available that features a PC-based software application and programming hardware for designing and downloading patterns into the scanner. The kit can be used as a quick way to start integration with the scanner and as a production support system for programming and testing once the integration is done. The kit comes complete with a laser light source, focusing lens, power supply and demonstration patterns and documentation.

The scope of the present disclosure is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the disclosure. Furthermore, individual features mentioned in different claims, may possibly be advantageously combined, and the mentioning of these features in different claims does not exclude that a combination of features is not possible and advantageous.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

The invention claimed is

1. An optical scanner, comprising:
a mirror mounted for rotation around at least two axes of rotation, the at least two axes of rotation having a first axis of rotation and a second axis of rotation;
a first actuator that rotates the mirror around the first axis of rotation;
a first driver that drives the first actuator;
a first angular position sensor that senses an angular position of the mirror around the first axis of rotation;
a second actuator that rotates the mirror around the second axis of rotation;
a second driver that drives the second actuator;
a second angular position sensor that senses an angular position of the mirror around the second axis of rotation;
a controller coupled to the first and second drivers to drive the respective first and second actuators to rotate the mirror into respective angles around the first and second axes of rotation, respectively; and
a memory storing a set of scan patterns, wherein the set of scan patterns includes a first scan pattern and a second scan pattern that is different from the first scan pattern;
wherein the controller is configured to access one of the scan patterns from the memory, and control a positioning of the mirror based at least in part on the one of the scan patterns accessed from the memory.

2. The optical scanner according to claim 1, wherein the first and second axes of rotation are substantially perpendicular to each other.

3. The optical scanner according to claim 2, wherein the first and second axes of rotation intersects each other.

4. The optical scanner according to claim 3, wherein the point of intersection substantially resides on a surface of the mirror.

5. The optical scanner according to claim 4, wherein the point of intersection resides substantially on a center of the surface of the mirror.

6. The optical scanner according to claim 1, wherein the electronic signals comprise commands that include a command for positioning the mirror for deflection of an electromagnetic beam incident upon it into a specific direction in a spherical coordinate system.

7. The optical scanner according to claim 1, wherein the controller is configured to sequentially control the angular positions of the mirror so that an electromagnetic beam incident upon the mirror traverses the one of the scan patterns.

8. The optical scanner according to claim 7, wherein the controller is configured to sequentially control the angular positions of the mirror so that the electromagnetic beam traverses the one of the scan patterns within a prescribed time.

9. The optical scanner according to claim 7, wherein the prescribed time is variable and is set by a specific time command.

10. The optical scanner according to claim 1, further comprising a source for emission of an electromagnetic beam, wherein the source is operatively coupled to the controller.

11. The optical scanner according to claim 1, further comprising an optical connector for interconnection with a source for emission of an electromagnetic beam.

12. The optical scanner according to claim 1, further comprising a focusing lens positioned in a propagation path of an electromagnetic beam for focusing the electromagnetic beam at a specific distance from the optical scanner.

13. The optical scanner according to claim 12, wherein the focusing lens is movable.

14. The optical scanner according to claim 12, wherein the focusing lens is mounted for rotation together with the mirror.

15. The optical scanner according to claim 1, wherein the mirror comprises a segmented mirror for splitting an electromagnetic beam incident upon it into a plurality of deflected electromagnetic beams propagating along different respective propagation paths.

16. The optical scanner according to claim 1, further comprising an optical sensor for sensing electromagnetic radiation received from a surface illuminated by the scanner and deflected into the optical sensor by the mirror.

17. The optical scanner according to claim 1, wherein the mirror is configured to deflect an infrared light.

18. The optical scanner according to claim 1, wherein the mirror is configured to deflect a visible light beam.

19. The optical scanner according to claim 1, wherein the first actuator comprises a first magnetic actuator, and the second actuator comprises a second magnetic actuator.

20. The optical scanner according to claim 1, wherein the first angular position sensor comprises a first magnetic sensor, and the second angular position sensor comprises a second magnetic sensor.

21. The optical scanner according to claim 1, further comprising a monitoring device for obtaining temperature from a rear side of the mirror.

22. A device, comprising:
an optical scanner that comprises:
a mirror;
a first actuator that rotates the mirror around a first axis of rotation;
a first angular position sensor that senses an angular position of the mirror around the first axis of rotation;
a second actuator that rotates the mirror around a second axis of rotation;
a second angular position sensor that senses an angular position of the mirror around the second axis of rotation;
a controller coupled to the first and second drivers to drive the respective first and second actuators to rotate the mirror into respective angles around the first and second axes of rotation; and
a memory coupled to the controller and adapted to store a set of scan patterns, the set of scan patterns having a first scan pattern and a second scan pattern that is different from the first scan pattern;
wherein the controller, upon receipt of a command, accesses one of the scan patterns from the memory and sequentially controls the angular positions of the mirror based at least in part on the one of the scan patterns;
wherein the first actuator comprises a first magnetic actuator; and
wherein the second actuator comprises a second magnetic actuator.

23. The device of claim 22, wherein the first and second axes of rotation intersects each other at a point of intersection on a surface of the mirror.

24. The device of claim 22, wherein the controller is configured to sequentially control the angular positions of the mirror so that the electromagnetic beam traverses the one of the scan patterns within a prescribed time.

25. The device of claim 22, further comprising a focusing lens positioned in a propagation path of an electromagnetic beam for focusing the electromagnetic beam at a specific distance from the optical scanner.

26. The device of claim 25, wherein the mirror comprises a segmented mirror for splitting the electromagnetic beam incident upon it into a plurality of deflected electromagnetic beams propagating along different respective propagation paths.

27. The device according to claim 22, wherein the first angular position sensor comprises a first magnetic sensor, and the second angular position sensor comprises a second magnetic sensor.

28. The device according to claim 22, further comprising a monitoring device for obtaining temperature from a rear side of the mirror.

* * * * *